(12) United States Patent
Drew

(10) Patent No.: US 10,152,067 B2
(45) Date of Patent: Dec. 11, 2018

(54) PROGRAMMABLE THERMOSTAT

(71) Applicant: Emerson Electric Co., St. Louis, MO (US)

(72) Inventor: David Scott Drew, St. Louis, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 505 days.

(21) Appl. No.: 14/325,291

(22) Filed: Jul. 7, 2014

(65) Prior Publication Data
US 2014/0309792 A1    Oct. 16, 2014

Related U.S. Application Data

(63) Continuation of application No. 12/858,594, filed on Aug. 18, 2010, now Pat. No. 8,770,490.

(51) Int. Cl.
| | |
|---|---|
| *F24F 11/65* | (2018.01) |
| *F24F 120/10* | (2018.01) |
| *F24F 120/14* | (2018.01) |
| *F24F 120/20* | (2018.01) |
| *G05D 23/19* | (2006.01) |

(Continued)

(52) U.S. Cl.
CPC .......... *G05D 23/1917* (2013.01); *F24F 11/30* (2018.01); *F24F 11/65* (2018.01); *G05D 23/1902* (2013.01); *G05D 23/1951* (2013.01); *F24F 2110/10* (2018.01);
(Continued)

(58) Field of Classification Search
CPC .......... G05D 23/1902; G05D 23/1904; G05D 23/1951; F24F 11/0034; F24F 2011/0064; F24F 11/65; F24F 11/66; F24F 2120/10; F24F 2120/14; F24F 2120/20
See application file for complete search history.

(56) References Cited

U.S. PATENT DOCUMENTS

| | | | |
|---|---|---|---|
| 4,298,946 A | | 11/1981 | Hartsell et al. |
| 4,632,177 A | * | 12/1986 | Beckey .............. G05D 23/1904 |
| | | | 165/239 |

(Continued)

*Primary Examiner* — Frantz Jules
*Assistant Examiner* — Daniel C Comings
(74) *Attorney, Agent, or Firm* — Harness, Dickey & Pierce, P.L.C.; Anthony G. Fussner

(57) ABSTRACT

A thermostat for a climate control system includes an electronic memory in which at least three occupancy settings are stored. The occupancy settings including a pre-defined unoccupied temperature set-point associated with an unoccupied state, a pre-defined occupied temperature set-point associated with an occupied-awake state and a pre-defined sleep temperature set-point associated with an occupied-asleep state. The thermostat's microprocessor is configured to communicate with the memory, and to establish at least three time periods during the day. The microprocessor assigns to each time period one of at least three user-selectable occupancy states including an unoccupied state, an occupied-awake state and an occupied-asleep state. The microprocessor controls operation of the climate control system to maintain the unoccupied temperature set-point during any time period assigned the unoccupied state, the occupied temperature set-point during any time period assigned the occupied-awake state, and the sleep temperature set-point to any time period assigned the occupied-asleep state.

20 Claims, 8 Drawing Sheets

(51) Int. Cl.
*F24F 11/30* (2018.01)
*F24F 110/10* (2018.01)

(52) U.S. Cl.
CPC ....... *F24F 2120/10* (2018.01); *F24F 2120/14* (2018.01); *F24F 2120/20* (2018.01); *G05D 23/1904* (2013.01)

(56) References Cited

U.S. PATENT DOCUMENTS

| | | | |
|---|---|---|---|
| 5,544,036 A * | 8/1996 | Brown, Jr. | G05D 23/1905 340/12.52 |
| 5,937,942 A | 8/1999 | Bias et al. | |
| 6,260,765 B1 * | 7/2001 | Natale | G05D 23/1905 236/47 |
| 7,114,554 B2 * | 10/2006 | Bergman | G05B 19/106 165/238 |
| 7,299,996 B2 | 11/2007 | Garrett et al. | |
| 2007/0114293 A1 | 5/2007 | Gugenheim | |
| 2011/0257795 A1 * | 10/2011 | Narayanamurthy | F24F 5/0046 700/277 |

* cited by examiner

PROGRAMMABLE THERMOSTAT

CROSS-REFERENCE TO RELATED APPLICATION

This application is a continuation of U.S. patent application Ser. No. 12/858,594 filed on Aug. 18, 2010, to be issued as U.S. Pat. No. 8,770,490 on Jul. 8, 2014. The entire disclosure of the above application is incorporated herein by reference.

FIELD

The present disclosure relates to thermostats for controlling the level of operation of a climate control system to adjust the temperature of a space to maintain a temperature set-point.

BACKGROUND

This section provides background information related to the present disclosure which is not necessarily prior art.

Many digital programmable thermostats allow for programming time and temperature settings for various days of the week. However, the typical programmable thermostat requires entry of temperature settings for numerous different time periods that the user must select, which entails pressing the necessary series of different buttons to program the thermostat. If the user is faced with a thermostat having a daunting series of different buttons to press and screens to progress through to enter such temperature settings, the user is not likely to realize any energy savings due to the user's apprehension towards programming the thermostat.

SUMMARY

This section provides a general summary of the disclosure, and is not a comprehensive disclosure of its full scope or all of its features.

Various embodiments are disclosed of a thermostat for controlling the operation of a climate control system to adjust the temperature of a space to maintain a select predefined temperature set-point associated with a given time period during the day. One embodiment of a thermostat for a climate control system includes an electronic memory in which at least three occupancy settings are stored. The at least three occupancy settings include a pre-defined unoccupied temperature set-point associated with an unoccupied state, a pre-defined occupied temperature set-point associated with an occupied-awake state and a pre-defined sleep temperature set-point associated with an occupied-asleep state. The thermostat further includes a microprocessor configured to communicate with the electronic memory, and to establish at least three time periods during the day. The microprocessor is configured to assign to each of the time periods one of at least three user-selectable occupancy states including an unoccupied state, an occupied-awake state and an occupied-asleep state. Accordingly, the microprocessor controls operation of the climate control system to maintain the unoccupied temperature set-point during any time period assigned the unoccupied state, and to maintain the occupied temperature set-point during any time period assigned the occupied-awake state, and to maintain the sleep temperature set-point during any time period assigned the occupied-asleep state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
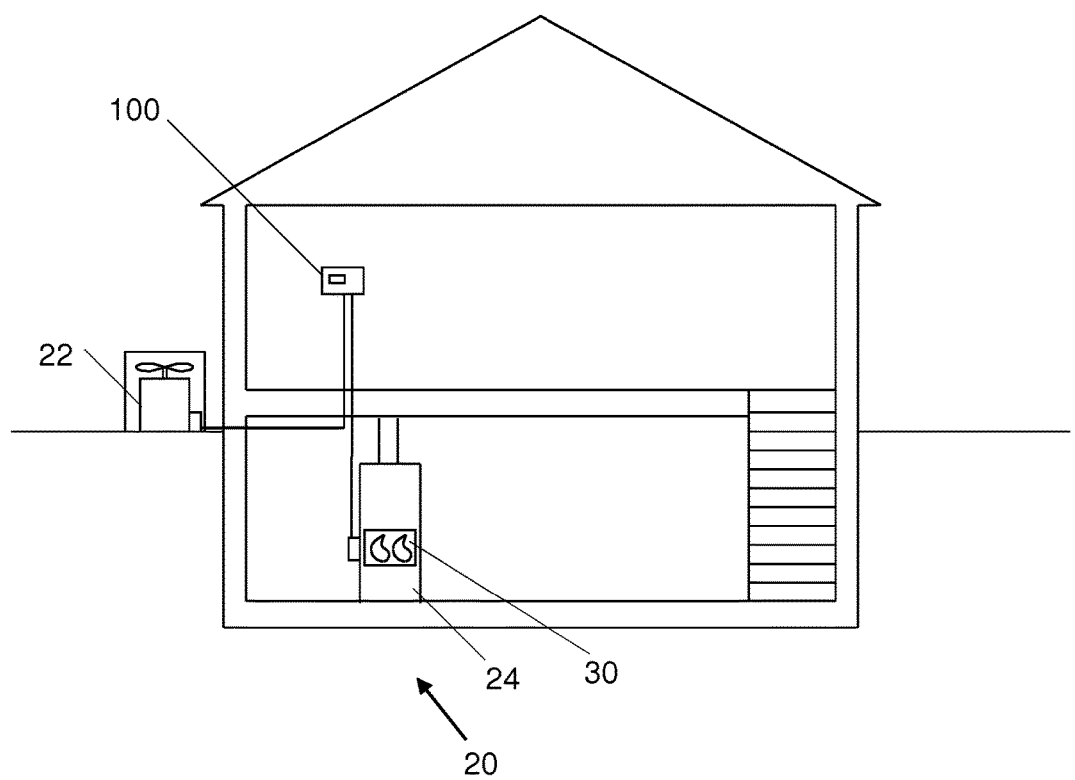
FIG. 1 is an illustration of a building incorporating one embodiment of a thermostat according to the principles of the present disclosure.

In the various embodiments of the present disclosure, a thermostat is provided for controlling an air conditioner or heating system to adjust the temperature of a space to maintain a predefined temperature set-point associated with a user-selected occupancy state. Referring to FIG. 1, a programmable thermostat 100 is provided that is preferably in communication with various components of a climate control system 20. The climate control system 20 may include an air conditioning system having a compressor unit 22 and a blower unit 24, and/or a heating system 30 with a blower unit 24. The thermostat 100 controls the operation of the air conditioning system via connections to a compressor unit 22 and a blower unit 24. The thermostat 100 controls operation of the climate control system 20 as needed to adjust the sensed temperature in the space to maintain a predefined temperature set-point associated with an occupancy state for a given time period of the day. More specifically, the thermostat 100 is programmable to include at least three time periods during the day, and a number of predefined temperature set-points associated with the at least three time periods, as explained below.

Figure 2:
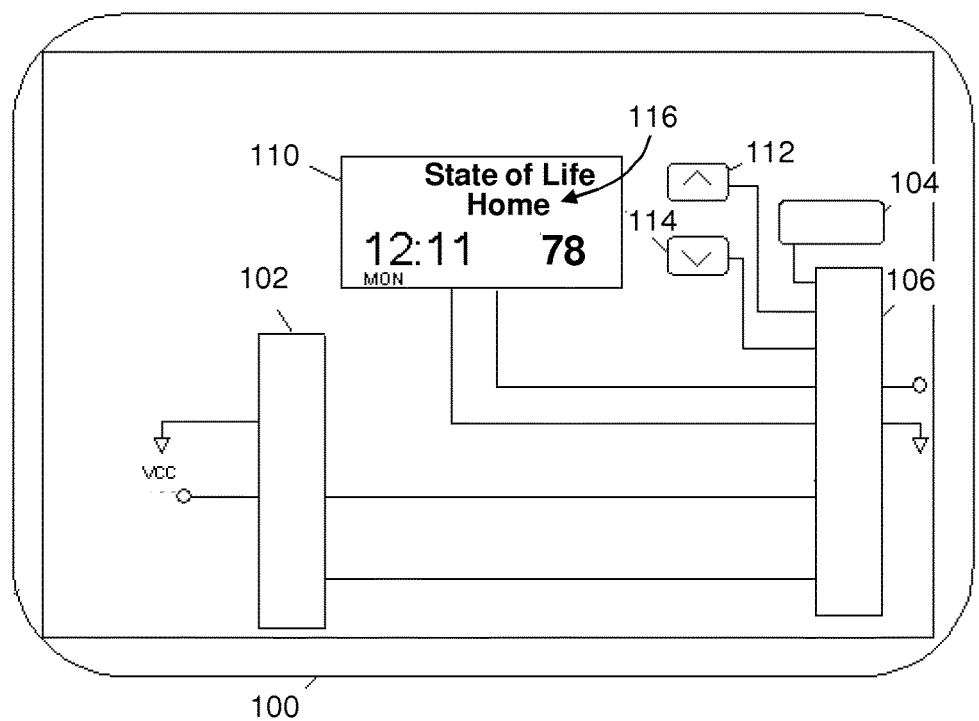
FIG. 2 is a schematic illustration of a first embodiment of a thermostat, in accordance with the present disclosure.

Referring to FIG. 2, a schematic diagram provides an illustration of a first embodiment of the thermostat 100, according to the principles of the present disclosure. The thermostat 100 includes an electronic memory 102, such as an electronically erasable programmable read-only-memory (EEPROM), in which at least three occupancy settings are stored. The at least three occupancy settings include a pre-defined unoccupied temperature set-point associated with an unoccupied state, a pre-defined occupied temperature set-point associated with an occupied-awake state and a pre-defined sleep temperature set-point associated with an occupied-asleep state. These predefined temperature setpoints are the only temperature set-points utilized by the thermostat 100 for controlling operation of the climate control system 20 to adjust the temperature in the space.

The thermostat 100 further includes an internal temperature sensor 104, which sensor allows for determining the sensed temperature within the space. The sensor 104 preferably comprises a temperature responsive device that outputs a variable, value or signal that is indicative of the temperature in the space. The sensor 104 may be any of a number of sensor types, and may comprise a crystal, oscillator or other electronic component having a frequency that responsively changes with temperature. Alternatively, the sensor 104 may comprise a thermistor having a resistance value that changes in response to changes in temperature. The sensor 104 could also be a device capable of communicating a voltage value that correlates to, or is indicative of, the temperature sensed in the space. The sensor 104 may include circuitry to permit the sensor to communicate an absolute value of the temperature to a tenth of degree Fahrenheit. Likewise, the sensor 104 may also include circuitry to enable communication of temperature information on a periodic basis, or upon request, such as when prompted by a microprocessor 106 of the thermostat 100. Accordingly, in the various embodiments, the temperature sensor 104 is configured to sense and provide information that is indicative of the sensed temperature in the space.

The thermostat 100 further includes a display device 110 and at least one user input means for permitting user adjustment or selection, for example. The input means preferably comprises one or more buttons 112, 114 for use in adjustment, navigation and/or selection purposes. Alternatively, a display device may include an input means that comprises a touch-sensitive switch membrane (not shown) disposed over the display device 110, which may be associated with an icon displayed on the display device. The user input means permit the user to select an occupancy setting 116 from one of at least three settings (unoccupied, occupied or sleep) for each of the time periods during the day, as explained below.

The thermostat 100 further includes a microprocessor 106 that is in communication with the at least one temperature sensor 104, and obtains the output or signal information from the sensor 104 indicative of the temperature in the space for use in determining a sensed temperature value. The thermostat microprocessor 106 is configured to compare the sensed temperature to a predefined temperature set-point, and to control operation of the climate control system 20 by initiating signals for activating the air conditioning system compressor unit 22 where the space temperature is above a predefined temperature set-point, or initiating signals for activating the heating system 30 where the space temperature is below a predefined temperature set-point.

The microprocessor 106 preferably includes a software program for controlling the thermostat 100 to control operation of a climate control system 20 to maintain a select pre-defined set-point temperature for a space. Specifically, the microprocessor 106 is programmed or encoded with software instructions that are operable to compare the sensed temperature to a predefined temperature set-point and to initiate signals to activate the climate control system 20 to maintain a set-point temperature, as explained below.

The microprocessor 106 is configured to communicate with the electronic memory 102, and is configured to establish at least three time periods during the day during which different predefined temperature setpoints are maintained. The microprocessor 106 is preferably configured to assign to each of the time periods one of at least three user-selectable occupancy states, including an unoccupied state, an occupied-awake state and an occupied-asleep state. The microprocessor 106 is configured to control operation of the climate control system 20 to maintain a predefined set-point temperature associated with the user-selected occupancy state. Specifically, the microprocessor 106 includes a read-only-memory that is programmed or encoded with instructions operable to designate, for each of three or more time periods during the day, one of at least three user-selectable occupancy states including an unoccupied state, an occupied-awake state and an occupied-asleep state. The microprocessor 106 and the encoded instructions are operable to assign the unoccupied temperature set-point to each time period designated (by a user) as the unoccupied state, the occupied temperature set-point to each time period designated (by a user) as the occupied-awake state, and the sleep temperature set-point to each time period designated (by a user) as the occupied-asleep state. The thermostat 100 does not permit a user to enter a numerical temperature set-point value, but rather only permits selection of a setpoint from the predefined unoccupied temperature set-point, the pre-defined occupied temperature set-point and the pre-defined sleep temperature set-point.

Figure 3:
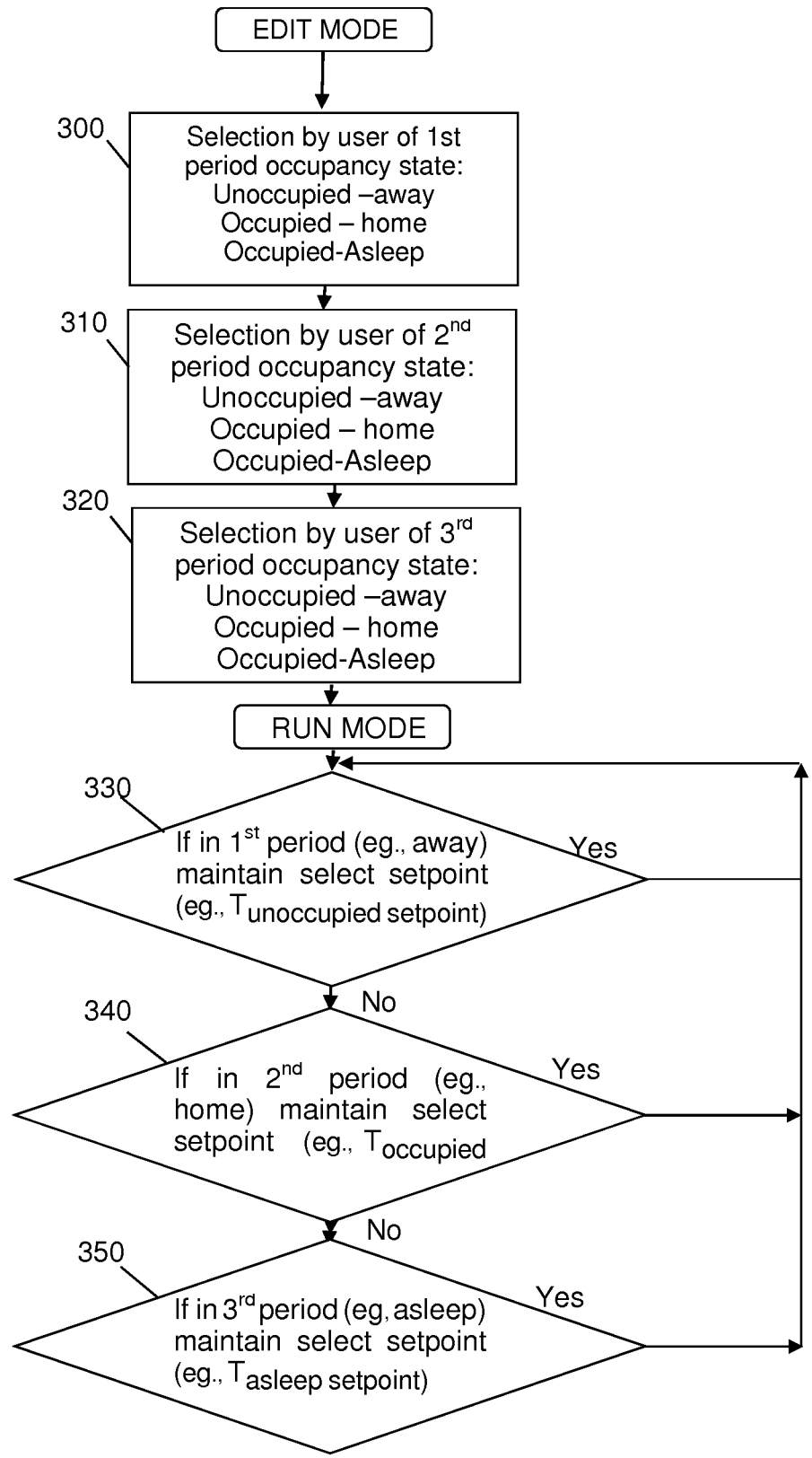
FIG. 3 shows a flow chart illustrating the programming of the thermostat of the first embodiment.

Referring to FIG. 3, a flow chart is shown illustrating the software program and/or instructions of the microprocessor 106 regarding designation of occupancy states and pre-defined temperature set-points. The microprocessor 106 (or software program) may be operable in both a run mode and an edit mode, as explained. For a first time period during the day, such as 8 AM to 4 PM for example, the microprocessor 106 (or software program) allows a user to select at step 300 a desired occupancy state from an unoccupied state, an occupied-awake state and an occupied-asleep state. The microprocessor 106 (or software program) continues in steps 310 and 320 with the selection of occupancy states for a second time period (4:00 PM to 10:59 PM, for example) and a third time period (11:00 PM to 7:59 AM, for example). In the run mode in steps 330-350, the microprocessor 106 is configured to maintain the unoccupied temperature set-point during any time period assigned the unoccupied state, and to maintain the occupied temperature set-point during any time period assigned the occupied-awake state, and to maintain the sleep temperature set-point during any time period assigned the occupied-asleep state. Accordingly, the microprocessor 106 is configured to control operation of the heating system 30 and/or air conditioner compressor unit 22 during each of the at least three time periods to maintain only one of the pre-defined unoccupied temperature set-point, the pre-defined occupied temperature set-point or the pre-defined sleep temperature set-point. Each of the pre-defined unoccupied temperature set-point, the pre-defined occupied temperature set-point, and the pre-defined sleep temperature set-point are preferably default values that are stored in a memory of the thermostat, which may be stored at the time of manufacture, for example. Additionally, the pre-defined unoccupied temperature set-point value, the pre-defined occupied temperature set-point value, and the pre-defined sleep temperature set-point value may each be adjusted by a user of the thermostat.

Figure 4:
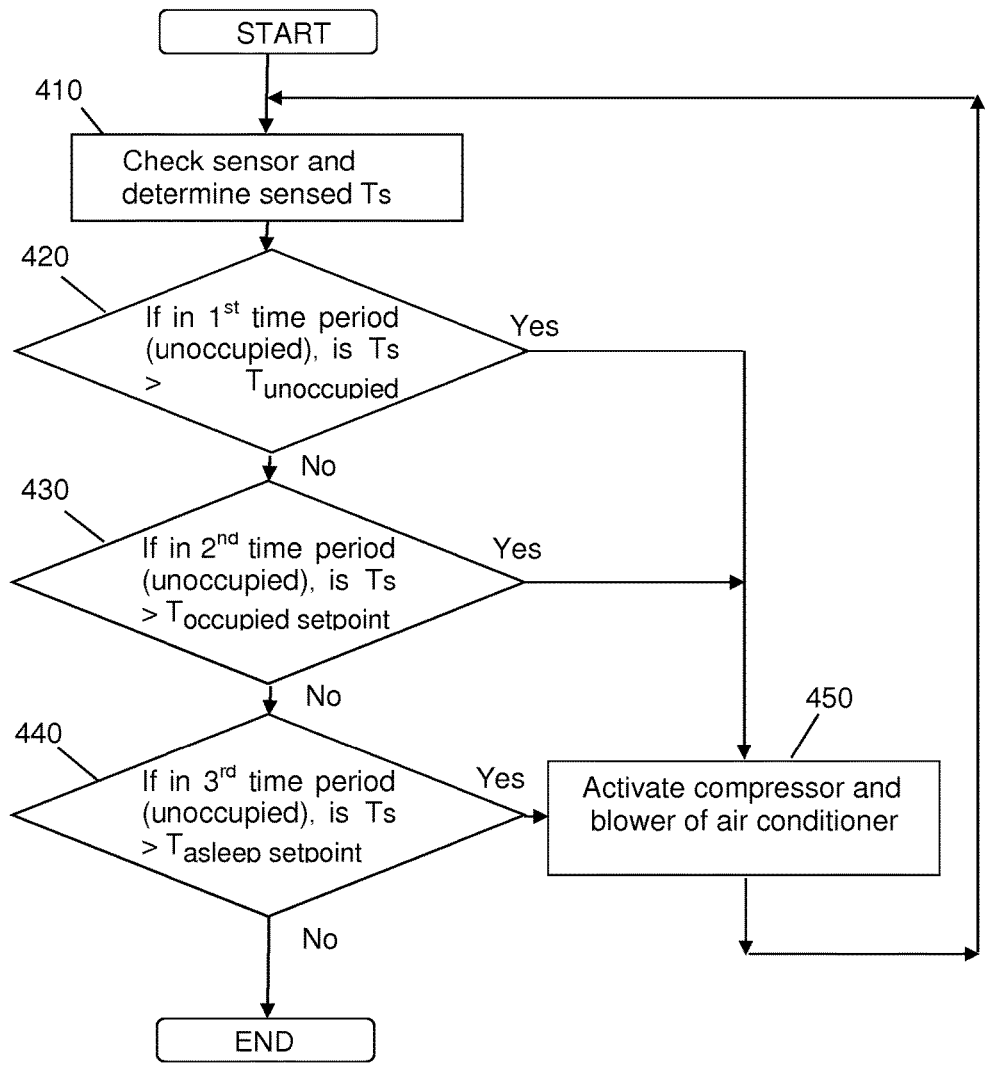
FIG. 4 shows a flow chart illustrating the control of a climate control system by the thermostat of the first embodiment.

Referring to FIG. 4, a flow chart is shown illustrating the control of the microprocessor 106 of the thermostat 100 of the first embodiment, in a cooling mode. At step 410, the microprocessor 106 determines a sensed temperature value from the sensor information that is indicative of the sensed temperature, which is then stored. Where operation is during a first time period that has been assigned an unoccupied state by the user, the microprocessor 106 compares at step 420 the sensed temperature to the predefined unoccupied temperature set-point associated with an unoccupied state (85° F., for example). Where the sensed temperature is below the predefined unoccupied temperature set-point, the microprocessor 106 does not initiate operation of the climate control system 20. Where operation is during a second time period that has been assigned an occupied state by the user, the microprocessor 106 compares at step 430 the sensed temperature to the predefined occupied-awake temperature set-point associated with an unoccupied state (78° F., for example). Where the sensed temperature is above the predefined occupied temperature set-point, the microprocessor 106 initiates signals for activating relays to activate the air conditioning system at step 450. Where operation is during a third time period that has been assigned a sleep state by the user, the microprocessor 106 compares at step 440 the sensed temperature to the predefined occupied-asleep temperature set-point associated with the sleep state (76° F., for example). Where the sensed temperature is below the predefined occupied-asleep temperature set-point, the microprocessor 106 would not initiate operation of the climate control system 20.

In the above embodiment, the thermostat 100 is operable in either a cooling or heating mode of operation. For the cooling mode of operation, the thermostat 100 may, for example, have a pre-defined occupied-awake temperature set-point of 78 degrees Fahrenheit. The pre-defined unoccupied temperature set-point and pre-defined asleep temperature set-point are preferably both off-set at least 3 degrees relative to the pre-defined occupied temperature set-point, to provide for reduced cooling operation and energy cost savings. The thermostat 100 may, for example, have a pre-defined unoccupied-away temperature set-point of 85 degrees Fahrenheit, and a pre-defined occupied-asleep temperature set-point of 80 degrees Fahrenheit, which settings would provide for reduced cooling operation and energy costs relative to the 78 degree setpoint. Accordingly, the above thermostat 100 may include a pre-defined occupied temperature set-point of 79 degrees Fahrenheit or less that is associated with an occupied-awake state, a pre-defined unoccupied temperature set-point greater than 80 degrees Fahrenheit that is associated with an unoccupied state, and a pre-defined sleep temperature set-point greater than 79 degrees Fahrenheit that is associated with an occupied-asleep state, whereby the predefined temperature set-points provide for reduced energy costs.

Figure 5:
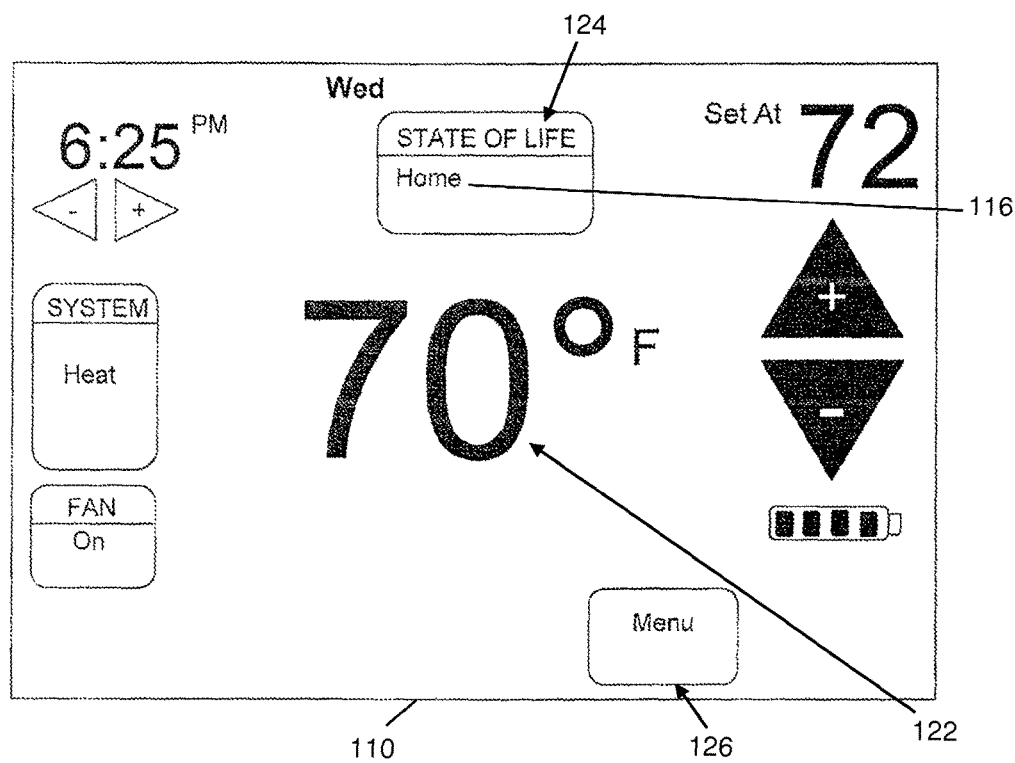
FIG. 5 shows an alternate embodiment of a thermostat including the display with a menu option, according to the principles of the present disclosure.
Figure 6:
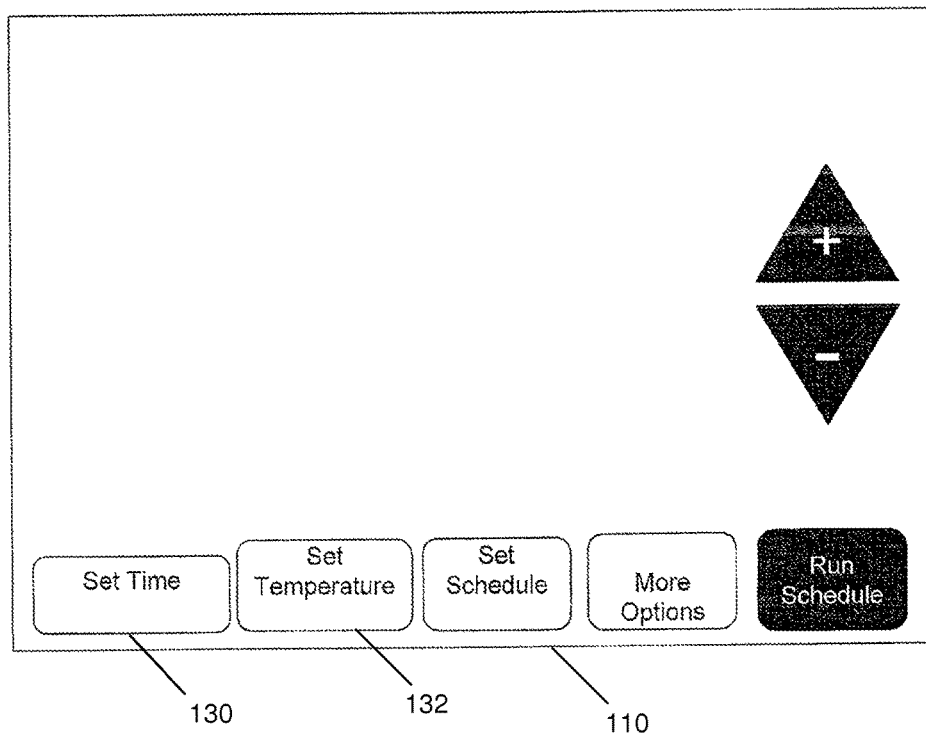
FIG. 6 shows the display in FIG. 5 with a temperature setting option.
Figure 7:
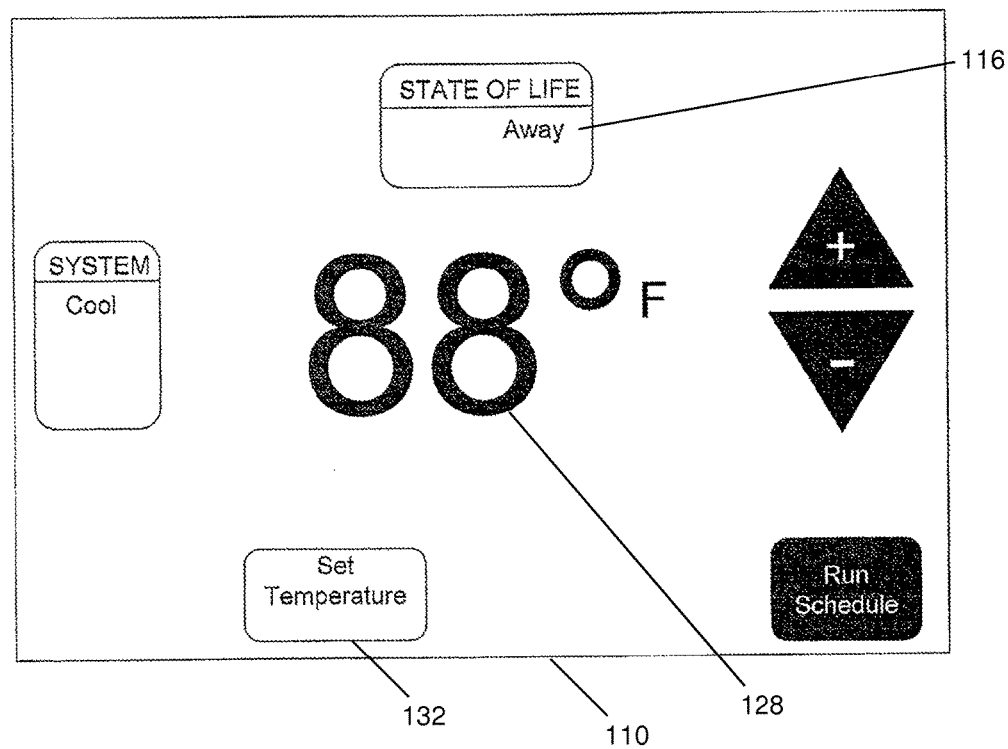
FIG. 7 shows the display in FIG. 5 with a user selectable field.
Figure 8:
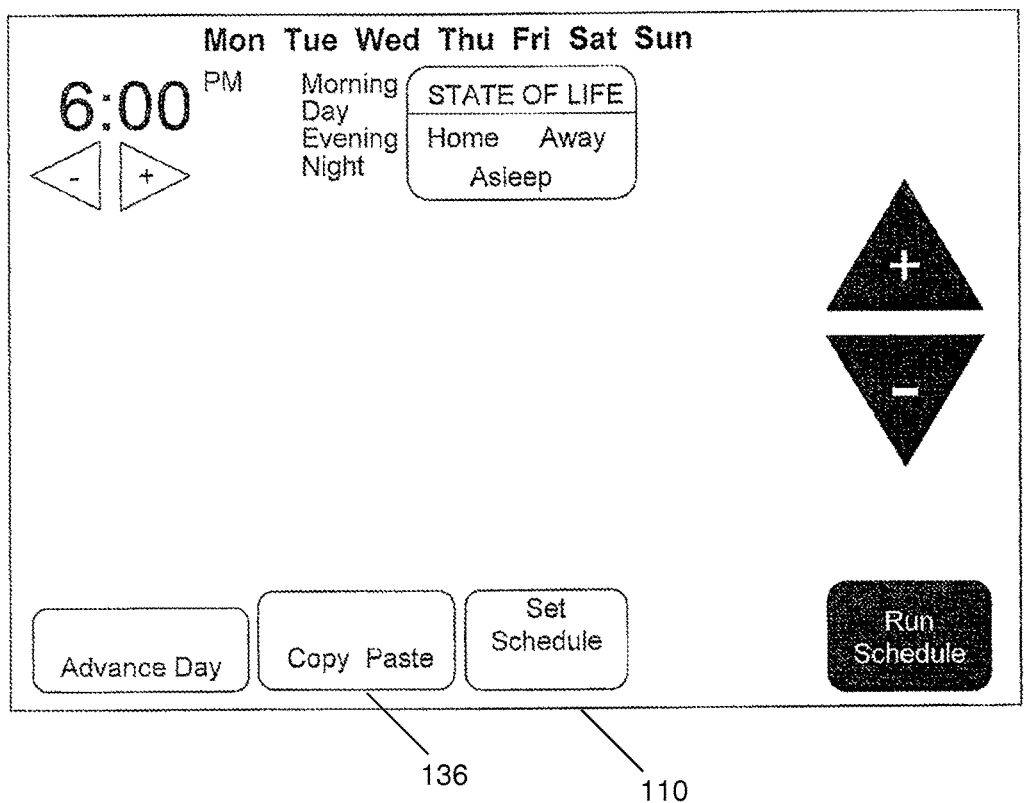
FIG. 8 shows the display of the thermostat in FIG. 5 with a copy settings option.

Referring to FIGS. 5-8, an alternate construction of the thermostat 100 is shown with an enlarged display device 110, such as an LCD display, which may further include a touch-sensitive switch membrane (not shown) on the display that is in communication with the microprocessor 106. As shown in FIG. 5, the display device 110 may be configured to display information such as the current sensed temperature 122 (e.g., 70° F.), a "state of life" or occupancy heading 124, the current "state of life" or occupancy setting 116 (e.g., occupied or home), and a menu option 126. Upon selecting the menu option, the display device 110 displays a set time option 130 and set temperature option 132, as shown in FIG. 6. Upon selecting the set temperature option 132, the display device 110 displays a displayed temperature set-point 128 for a given time period, as in FIG. 7. The displayed temperature set-point 128 shown in FIG. 7 is the unoccupied temperature set-point (e.g., 88° F.) associated with the displayed occupancy setting 116 of "Away". Using the input means, the user can change a user-selectable field for the occupancy setting 116 to "Home" or "Asleep," which will change the displayed temperature set-point 128 to either the occupied-awake temperature set-point or occupied-asleep temperature set-point. Thus, for each time period during the day, the user can simply select a "State Of Life" setting based on whether they are away, home or asleep, and have an associated temperature set-point automatically set for the time period. As shown in FIG. 8, the user can also use a copy option 136 to copy and paste settings from one day to other days of the week.

By displaying a "State Of Life" setting for either "Home," "Away" or "Asleep," the user can simply select a "State Of Life" setting based on whether they are away, home or asleep and have an associated temperature set-point automatically set, to thereby eliminate the need for successively entering temperature set-points. In this manner, the user would be able to more easily program the thermostat, such that the user would be more likely to select temperature set-points during unoccupied or asleep time periods that would result in reduced energy consumption. Accordingly, the thermostat 100 provides a user with a more simplified way to program settings for a thermostat to reduce energy consumption during specific time periods to reduce energy costs.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A thermostat for a climate control system, comprising:
   a memory of the thermostat for storing a plurality of occupancy state set-points including one or more unoccupied temperature set-points, one or more awake temperature set-points, and one or more sleep temperature set-points; and
   a processor of the thermostat configured to:
      receive a first user input predefining, independently of any time period scheduled or schedulable for thermostat operation, one or more of the occupancy state set-points;
      assign, independently of any time period scheduled or schedulable for thermostat operation, each predefined occupancy state set-point to a corresponding one of a plurality of occupancy states including an unoccupied state, an awake state, and a sleep state; and
      receive a second user input specifying one or more of the occupancy states in association with one or more time periods, such that the thermostat is configured to, based the second user input, automatically associate the one or more occupancy state set-points assigned to a given specified occupancy state with a given specified time period;
   the thermostat configured to control operation of the climate control system to maintain one of the pre-defined occupancy state set-points during any time period associated with the occupancy state corresponding to the one of the predefined occupancy state set-points.

2. The thermostat of claim 1, wherein one or more of the time periods is assigned to one of the occupancy states based on the second user input.

3. The thermostat of claim 1 wherein the occupancy state set-points comprise heating temperature set-points for a heating mode, and cooling temperature set-points-for a cooling mode of the climate control system;
   wherein if the second user input specifies a given occupancy state in association with a given time period, the processor is thereby configured to associate heating and cooling temperature set-points assigned to the specified given occupancy state with the specified given time period.

4. The thermostat of claim 1, selectively configured to control operation of the climate control system to maintain a set-point selected only from the pre-defined occupancy state set-points.

5. The thermostat of claim 1, wherein the one or more time periods are adjustable.

6. The thermostat of claim 1, wherein the occupancy states are selectable for each day of the week.

7. The thermostat of claim 1, wherein the one or more of the occupancy states is associated with the one or more time periods independently of the first user input.

8. The thermostat of claim 1, wherein default values are provided by a manufacturer of the thermostat for the one or more unoccupied temperature set-points, the one or more awake temperature set-points, and the one or more sleep temperature set-points.

9. The thermostat of claim 1, wherein the one or more pre-defined unoccupied temperature set-points, the one or more pre-defined awake temperature set-points, and the one or more pre-defined sleep temperature set-points are user-adjustable.

10. A thermostat for a climate control system, comprising:
    a memory of the thermostat in which a plurality of occupancy state temperature set-points are stored and assigned to a plurality of occupancy states including an unoccupied state, an awake state, and a sleep state, where the occupancy state temperature set-points are predefined for and assigned to the occupancy states independently of any time period scheduled or schedulable for thermostat operation; and
    a processor of the thermostat configured with the memory to control operation of the climate control system, the processor configured to execute instructions to:
    in response to user input, received by the thermostat, for each of a plurality of time periods in a day, associate a selected one of the unoccupied state, the awake state and the sleep state with the time period, whereby one or more pre-defined occupancy state temperature set-points assigned to the selected occupancy state are automatically associated with the time period;
    the thermostat further configured to control operation of the climate control system during a given time period to maintain a pre-defined occupancy state temperature set-point that corresponds to an occupancy state associated with the given time period.

11. The thermostat of claim 10, wherein one or more of the time periods is assigned to one of the occupancy states in response to the user input.

12. The thermostat of claim 10, wherein the time periods in the day are adjustable.

13. The thermostat of claim 10, selectively configured to control operation of the climate control system to maintain a set-point selected only from the pre-defined occupancy state temperature set-points.

14. The thermostat of claim 10, wherein a pre-defined unoccupied temperature set-point, a pre-defined awake temperature set-point, and a pre-defined sleep temperature set-point replace default values stored in the memory of the thermostat.

15. The thermostat of claim 10, wherein a pre-defined unoccupied temperature set-point, a pre-defined awake temperature set-point, and a pre-defined sleep temperature set-point are adjustable by a user of the thermostat.

16. The thermostat of claim 10, wherein the occupancy states are associated with the time periods independently of defining of the occupancy state temperature set-points.

17. A method of controlling a climate control system, the method comprising:
- a thermostat displaying, on a display for user selection therefrom independent of any time period scheduled or schedulable for thermostat operation, a plurality of occupancy states including an unoccupied state, an awake state, and a sleep state;
- the thermostat receiving at least one user input predefining at least one temperature set-point for assignment, independent of any time period scheduled or schedulable for thermostat operation, to one of the displayed occupancy states;
- storing in a memory of the thermostat one or more user-predefined temperature set-points including one or more of the following: one or more pre-defined unoccupied temperature set-points assigned to the unoccupied state, one or more pre-defined awake temperature set-points assigned to the awake state, and one or more pre-defined sleep temperature set-points assigned to the sleep state;
- the thermostat receiving a user selection of one of a plurality of time periods within a day, and receiving a user selection of one of the occupancy states for association with the user-selected time period, no temperature set-point being received in the user selections;
- the thermostat automatically associating a predefined temperature setpoint assigned to the user-selected occupancy state with the user-selected time period; and
- the thermostat establishing thermostat operation to maintain only an awake temperature set-point during any time period assigned the awake state, and only an unoccupied temperature set-point during any time period assigned the unoccupied state, and only a sleep temperature set-point during any time period assigned the sleep state.

18. The method of claim 17, further comprising assigning one of the time periods to one of the occupancy states based on the user selections.

19. The method of claim 17, further comprising associating, in accordance with the user selections, one or more of the occupancy states with one or more time periods for each day in a week.

20. The thermostat of claim 17, wherein the one or more of the occupancy states is associated with the one or more time periods independently of the pre-defining of the occupancy state temperature set-points.

* * * * *